United States Patent
Hermsmeyer et al.

(10) Patent No.: US 7,564,776 B2
(45) Date of Patent: Jul. 21, 2009

(54) METHOD FOR CONTROLLING THE TRANSPORT CAPACITY FOR DATA TRANSMISSION VIA A NETWORK, AND NETWORK

(75) Inventors: Christian Hermsmeyer, Eckental (DE); Dieter Stoll, Erlangen (DE); Oliver Tamm, Eckental (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 584 days.

(21) Appl. No.: 11/005,383

(22) Filed: Dec. 6, 2004

(65) Prior Publication Data

US 2005/0169280 A1 Aug. 4, 2005

(30) Foreign Application Priority Data

Jan. 30, 2004 (DE) .................. 10 2004 005 016

(51) Int. Cl.
*G01R 31/08* (2006.01)
*H04L 12/28* (2006.01)
*H04J 3/16* (2006.01)
*G02F 1/00* (2006.01)

(52) U.S. Cl. ............... 370/216; 370/395.21; 370/468

(58) Field of Classification Search ............... 370/468, 370/395.42, 395.4, 395.5, 230, 235, 216, 370/217, 218, 225, 400, 220, 221, 229, 238, 370/333, 396, 397, 395.51; 709/227, 228, 709/223

See application file for complete search history.

(56) References Cited

U.S. PATENT DOCUMENTS

| | | | | |
|---|---|---|---|---|
| 5,394,436 | A * | 2/1995 | Meier et al. ............... | 375/132 |
| 6,205,121 | B1 | 3/2001 | Heuer ...................... | 370/250 |
| 6,658,457 | B2 * | 12/2003 | Nishikawa et al. ......... | 709/206 |
| 6,970,451 | B1 * | 11/2005 | Greenberg et al. ......... | 370/352 |
| 7,027,453 | B2 * | 4/2006 | Lui et al. .................. | 370/408 |
| 7,058,008 | B1 * | 6/2006 | Wilson et al. ............. | 370/216 |
| 7,187,693 | B2 * | 3/2007 | Bamba ..................... | 370/468 |
| 7,257,120 | B2 * | 8/2007 | Saunders et al. ........ | 370/395.21 |
| 7,346,081 | B2 * | 3/2008 | Kfir ......................... | 370/537 |
| 7,394,758 | B2 * | 7/2008 | Gonda ...................... | 370/218 |
| 2003/0123472 | A1 | 7/2003 | Dufour et al. ............. | 370/442 |
| 2003/0161275 | A1 | 8/2003 | Malhotra et al. .......... | 370/256 |
| 2003/0202540 | A1 | 10/2003 | kfir et al. .................. | 370/498 |

FOREIGN PATENT DOCUMENTS

| | | |
|---|---|---|
| DE | 199 16 490 A1 | 10/2000 |
| DE | 102 45 638 A1 | 4/2004 |

\* cited by examiner

*Primary Examiner*—Hanh Nguyen

(57) ABSTRACT

A method and apparatus for controlling the transport capacity for data transmission in a network, providing a high level of resilience, and at the same time, avoiding excessive overdimensioning of network capacity. The method includes providing a transport connection having a basic data transport capacity, ascertaining measured variables which are a measure of the current data load on the transport connection, and aligning the data transport capacity of the transport connection dependent on the measured variable ascertained.

19 Claims, 5 Drawing Sheets

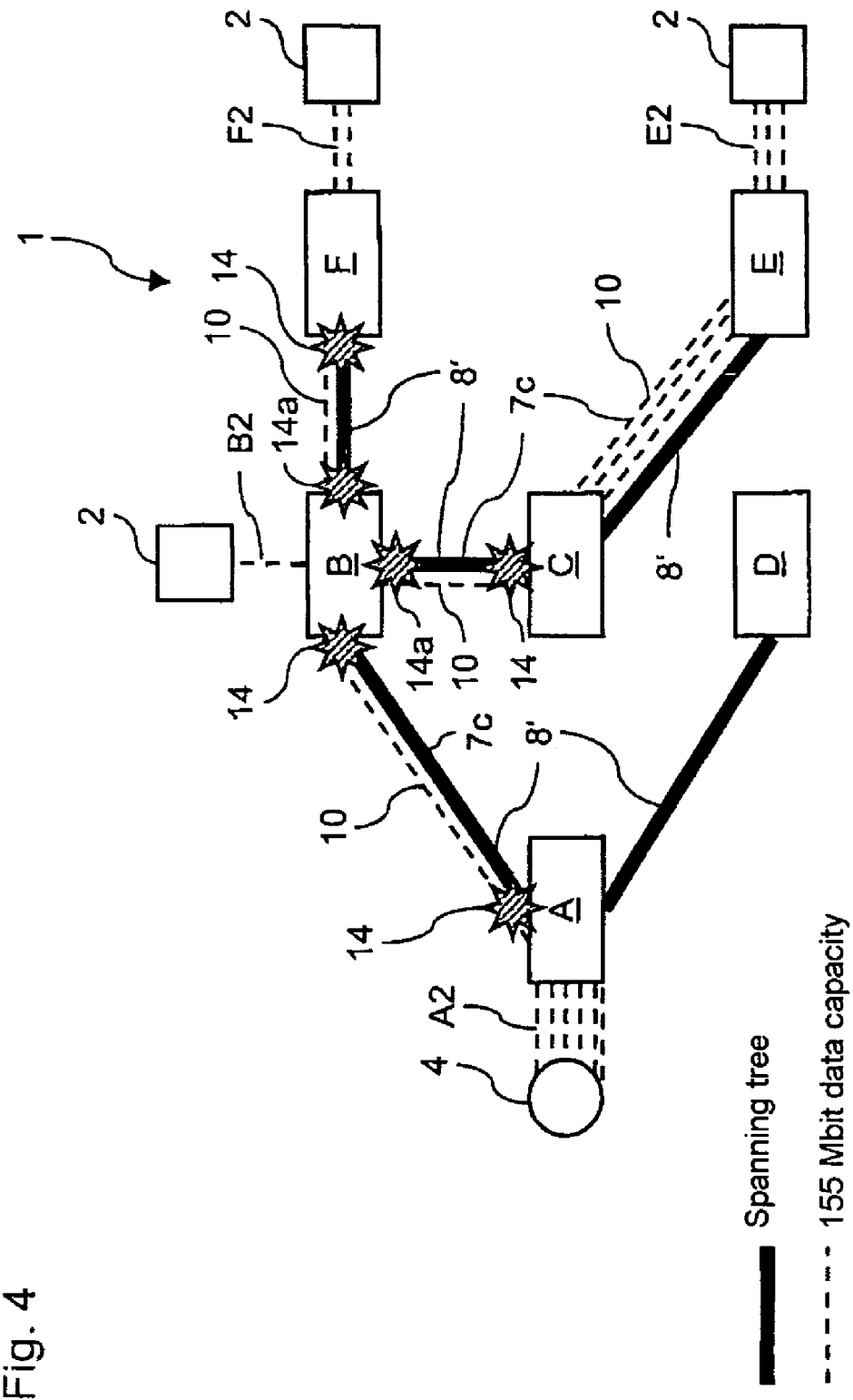

Fig. 4

Network nodes A-B: data transport capacity 155 Mbit < 930 Mbit user data stream
Network nodes A-E: data transport capacity 155 Mbit (limited by A-B and B-C) < 465 Mbit user data stream
Network nodes A-F: data transport capacity 155 Mbit (limited by A-B and B-F) < 310 Mbit user data stream
Total network nodes A-X: data transport capacity 155 Mbit (limited by A-B) < 930 Mbit user data stream — Spanning tree
--- 155 Mbit data capacity

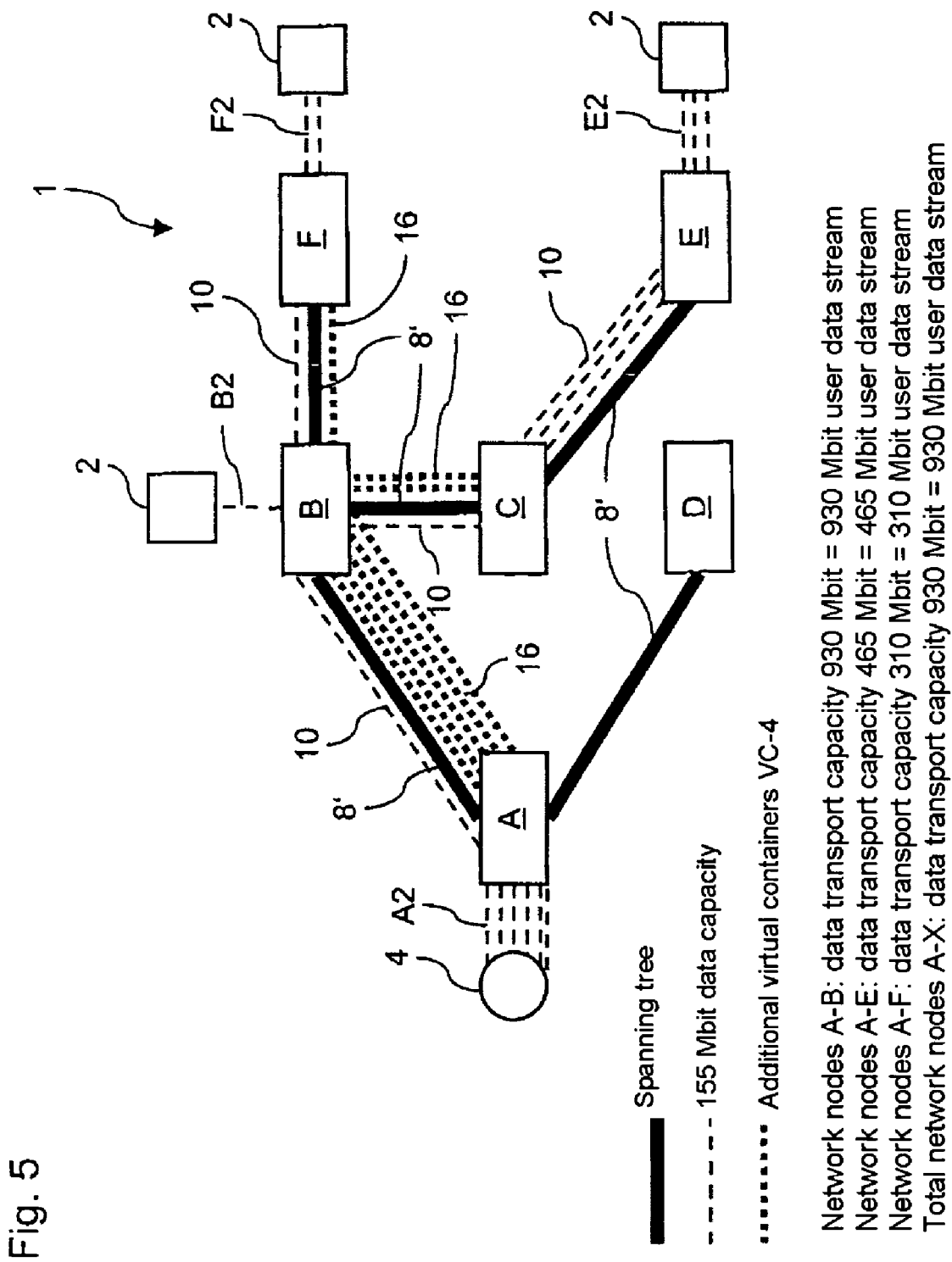

METHOD FOR CONTROLLING THE TRANSPORT CAPACITY FOR DATA TRANSMISSION VIA A NETWORK, AND NETWORK

FIELD OF THE INVENTION

The invention relates generally to methods and apparatus for controlling the transport capacity for data transmission via a network, and more specifically to methods and apparatus for controlling the transport capacity for packet-oriented data transport of Ethernet data via a SONET/SDH wide area network (WAN).

BACKGROUND OF THE INVENTION

Ethernet is currently the most widespread packet-oriented layer-II protocol used in WAN data networks and in virtually every local area network (LAN).

Ethernet interfaces are defined using IEEE standards and have developed further over decades from data rates of 2 Mbit/s to 10 Gbit/s per line. Later, a method for transmitting Ethernet based data streams using synchronous SDH/SONET infrastructures was developed. This method of transmission, which describes packing of Ethernet data streams into virtual SDH/SONET containers, is standardized in ITU G.7041NY.1303 as the "generic framing procedure" (GFP). The generic framing procedure involves the Ethernet data packets being transported via a SONET/SDH network using virtual containers. These containers form permanent and reserved connection resources between network elements (SONET/SDH circuit elements).

In addition, there is a standardized method based on G.783 for forming groups of virtually concatenated SONET/SDH containers. These groups can also vary in size (=number of concatenated virtual containers). The associated method is likewise standardized in ITU G.7042 as the link capacity adjustment scheme (LCAS).

Modern SDH/SONET transport networks use an integrated control plane, which implements the rapid set-up and release of connections independently, i.e. without configuration commands from a central network management point. This involves complex end-to-connections being routed via a large number of network element entities in the network.

The first applications for transporting Ethernet data via a SONET/SDH network were limited to point-to-point connections which were set up between Ethernet client access points. In the meantime, however, network providers have been asked to provide more flexibility by allowing large numbers of client access points to interchange data with one another so that they themselves are an (Ethernet) network. This extension of the transport functionality is known as multipoint-to-multipoint Ethernet transport. For this, transport network elements now need to be extended by a plurality of layer-II protocols and by an autonomous switching function. This switching function in accordance with IEEE 802.1D allows data packets to be switched dynamically between the various client access points and/or the transport connections in the wide area network. This is referred to generally as "Ethernet bridging".

Multipoint-to-multipoint Ethernet transport places even greater demands on monitoring the connecting capacity, however. By way of example, it is necessary to prevent data packets from being able to circulate in the network ("loops") and hence from taking up all the available bandwidth. Such a situation may arise because packets are transported connectionlessly in an Ethernet network, i.e. incoming data packets in every network element are forwarded to the appropriate output interface in real time on the basis of the destination address they contain without knowledge of the end-to-end connection. If the destination address of a data packet is not known in the network, however, this data packet can now be forwarded from one point to the next, and thus also in loops, and may even be distributed a number of times (broadcast) without ever leaving the network. To counter this problem of circulating data packets, the spanning-tree protocol was developed for Ethernet. A further development of the spanning-tree protocol is the rapid spanning-tree protocol, which makes considerably faster reaction and convergence times available. Both protocols are standardized on the basis of IEEE 802.1d and IEEE 802.1w. These protocols ensure that a loop-free active topology is provided in any physical connection topology. This loop-free active topology corresponds to a tree structure, the so called spanning tree in which there is always precisely one clear path to a destination.

Apart from overcoming the loop problem, the spanning-tree protocol also has another function. If parts of the active topology fail, the spanning tree is recalculated and hence previously inactive resources are activated. This means that the spanning-tree protocol may also be used as an equivalent circuit protocol. These mechanisms are known in local area networks (LANs) and have also been transferred to wide area networks. As transport medium, such wide area networks use, by way of example, a connection-oriented infrastructure based on the SONET/SDH standard and also the methods described above for transmitting frame-based Ethernet data streams using this infrastructure. This gives rise to a large number of new difficulties.

The reason for these difficulties is, by way of example, that a fixed connection capacity needs to be engaged for a multipoint-to-multipoint connection in the network, and parts of this capacity are disabled by the spanning-tree protocol in order to prevent loops. Thus, the network encounters unused resources which are not used again until a resource being used fails, owing to reconfiguration of the spanning tree.

The problem is also magnified by virtue of the above unused connection capacity disabled by the spanning-tree protocol needing to be severely overdimensioned in the case of the known methods. Otherwise, large parts of the data traffic can no longer be transported by the re-adjusted spanning tree in the event of a failure without data packets being lost.

The methods known up to now have therefore required that the network be overdimensioned in order to ensure sufficient resilience. This is extraordinarily cost-intensive.

SUMMARY OF THE INVENTION

One embodiment of the present invention provides a method for controlling the transport capacity for data transmission in a network which efficiently utilizes the capacity of the network and hence reduces the costs of the network, regardless of whether the network is constructed in the form of a pure point-to-point connection or in the form of a complex, interconnected network under the control of the spanning-tree protocol. Such a method and network are resilient and, at the same time, prevent excessive overdimensioning of the network capacity.

In preferred embodiments of the invention, methods are provided for flexibly and quickly reacting to failures and malfunctions in a network. Such methods and networks are able to be produced simply and inexpensively. Additionally, such methods and networks prevent, or at least reduce a number of the drawbacks of known methods.

In another embodiment of the invention a method is provided for controlling the transport capacity for data transmission via a network in which at least one transport connection is set up for transmitting data between a first and second network node in the network. This transport connection is used to transmit data between the first and the second network node.

The network may be, for example, a telecommunication network or a wide area network (WAN), and the transport connection via the wide area network may be, for example, a frame- or container-based transport connection based on the SDH or SONET standard. The integrated Ethernet switching functions in the network nodes preferably communicate with one another via the transport connection using an Ethernet protocol. Preferably, multipoint-to-multipoint connections between a plurality of client access points are provided on the network, and the Ethernet packets are transported via the SONET/SDH network by means of GFP using virtual concatenated containers. In this case, parts of the transport connections are disabled for user data transport by the spanning-tree protocol (in order to prevent loops) and are used only for control data interchange between the network nodes.

A transport connection between two Ethernet-switchable network nodes (bridges) may comprise, for example, one or more concatenated transport connections for the purpose of alignment with the data rate which is to be transported. The LCAS method, for example, can be used for capacity alignment, (e.g. for adding or removing individual or a plurality of transport containers to/from the transport connection, including during operation and without loss of packets).In this case, the transport connection, when it is set up or provided, first has a first data transport capacity which corresponds at this time to a predetermined basic data transport capacity. As soon as the data transmission takes place via the transport connection, that is to say the transport connection is provided below, a measured variable or a plurality of measured variables is/are ascertained which is/are a measure of the current data load or of the current data traffic. In addition, the WAN preferably comprises one or more management entities having means for changing the data transport capacity or bandwidth of the transport connection dependent on the measured variable ascertained.

The measured variable may, for example, be a measure of the current volume of data itself or a measure of the data loss or packet loss on account of underdimensioning of the transport connection.

Subsequently, the connection capacity or bandwidth of the transport connection is automatically changed on the basis of the measured variable ascertained.

In a first exemplary scenario, it is possible, even with an unchanged data load, e.g. when there is a failure in the network, to react automatically to a change in the connection capacity or bandwidth, e.g. in the event of a physical change in the transport connection on the basis of a line interruption, such that the connection capacity of the changed (new) transport connection is adapted to the existing data load again.

In a second exemplary scenario, the connection capacity may alternatively be changed such that any change in the data load causes the connection capacity to be adapted to the ascertained current data load in order to react automatically to the changed, particularly increased or reduced, data load for a constant data transport capacity.

Alternatively, or in addition, the data traffic via the network can contain various attributes, and the connection capacity can be changed on an attribute basis. Such attributes are, by way of example, different priority levels for the data or the virtual private network identification (VPN-ID).

By way of example, the data traffic via the transport connection can be divided up into different priority levels, and the connection capacity can be changed—requested or released—on the basis of the respective data's attribute.

In particular, the data traffic via the transport connection can thus be divided up into data of higher and lower priority, and the connection capacity can be changed dependent on the relative contribution of data with the higher and lower priority to the data traffic.

In line with one simple example, the network can be set up such that an embodiment of the inventive method is applied only to data traffic with a priority which exceeds a predefined minimum priority level.

In addition to supporting the resilience scheme on the active topology, the method according to embodiments of the invention can thus also be used for failure-free situations in order to allow bandwidth alignment with changes in the data traffic structures, e.g. in order to be aligned with a change in the relative contribution of data traffic with higher and lower priority.

It is clear that the functionalities of the two scenarios explained above may also be combined in the network, possibly on the basis of further parameters.

The method according to embodiments of the invention has the advantage that it is not necessary to provide an excessively large connection capacity in advance in order to be prepared for failures, such as interruptions in the data lines, but instead it is possible to align the connection capacity with the current requirements dynamically. In other words, the overdimensioning of the network capacity can be substantially reduced. This reduces the costs for the network operators, which in turn increases the attractiveness of Ethernet transport via SONET/SDH networks.

A failure in an Ethernet network accordingly results only in a brief data/packet loss, since the alignment of the data transport capacity or the "repair" is performed automatically and is not dependent on a user taking manual action in the system. This increases the resilience of the network.

With further advantage, a network can follow traffic requirements dynamically, which results in efficient utilization of the network.

A network may contain, for example, a large number of interconnected network nodes with an Ethernet bridging function and client access points, the network connections being able to comprise, for example, both point-to-point connections and multipoint-to-multipoint connections.

The spanning-tree protocol is preferably used to calculate an active topology, which is a subset of the physically provided transport connection topology, in the form of a loop-free tree structure, called spanning tree for transmitting the Ethernet data on the network.

In this context, only the Ethernet user data are linked to transmission along the spanning tree, while control data for the Ethernet protocol are transmitted via the entire network independently of the spanning tree.

According to one preferred embodiment, a primary spanning tree is set up. If there is a malfunction or failure which is accordingly detected, e.g. a line interruption, a new spanning tree is automatically set up or the spanning tree or the active topology is rearranged or reconfigured. Following renewed set-up or rearrangement, the measured variable is taken as a basis for requesting additional data transport capacity, which is made available to an extent such as to align the data transport capacity of the new active topology with the current data load. This is advantageous particularly because the distribution of the data traffic in the newly formed spanning tree can be predicted only with difficulty or not at all. Automatic alignment of the connection capacity with the bandwidth requirement on the basis of the method presented therefore allows the user data to be transmitted in line with the user data rate agreed between the network operator and his end client. This also applies, in particular, after the active topology of the spanning tree has changed.

In another embodiment of the invention, the measured variable, e.g. the current data load or packet loss, is ascertained locally in every network node along the spanning tree, which allows more precise fault analysis and flexible reactions to different scenarios. In this regard, the network nodes are autonomous.

According to another embodiment of the invention, network nodes in the spanning tree run a program which compares the current data load with the available data transport capacity of the transport connection and signals the comparison result to a management entity, which is preferably local to network nodes.

Subsequently, the management entity uses ASTN and uses LCAS to align the available data transport capacity of the transport connection with the current data load dependent on the comparison result. The alignment may be performed, for example, by setting up new container-based transport connections and adding them to an LCAS group or releasing container-based transport connections and removing them from an LCAS group.

Preferably, said measured variable, which represents the current data load at the network node, is ascertained regularly while the transport connection exists, which means that it is possible to react quickly to a change in the data load and/or in the data loss rate.

A preferred measured variable is the data loss, with the data loss rate being ascertained in the first and/or second or in every network node, and the data transport capacity of the transport connection being changed automatically dependent on the ascertained data loss rate. For a fixed data transport capacity, the data loss rate is in turn an indirect measure of the data load.

In another embodiment of the invention, the data loss rate is ascertained at least over a first period of time T_loss, and the ascertained data loss rate is subsequently compared with a first threshold value. If the data loss rate now permanently exceeds a predefined threshold value during the first period of time, additional data transport capacity, e.g. in the form of further SONET/SDH containers, is retrieved from the network for the transport connection.

In order to engage the additionally retrieved data capacity only for as long as is necessary, the measurement is preferably taken regularly or continuously and the threshold value comparison is likewise performed regularly or continuously. The data transport capacity of the transport connection, particularly the data transport capacity additionally retrieved previously, is released again if the data loss rate is permanently below a second predefined threshold value during a second period of time T_idle.

The threshold values can be defined differently at the different network nodes and/or for different data transport directions. This may be advantageous for asymmetric data traffic, e.g. in the case of unidirectional video broadcasting. In addition, the measured variable used can be further parameters for the transported data streams, e.g. VPN-ID, priorities etc.

It has also been found to be particularly simple to use the performance monitoring counters which exist anyway in the Ethernet layer and are described in the standard in order to ascertain the measured variable and to control the requesting and/or release of data transport capacity. The threshold value comparison can be performed either on the basis of the packet loss rate or on the basis of the bit loss rate, i.e. the data loss rate is determined as a packet loss rate or as a bit loss rate.

Network apparatus according to embodiments of the invention are also provided for requesting an increase or reduction in the data transport capacity of a transport connection between the network nodes in the network.

The invention is explained in more detail below using an exemplary embodiment and with reference to the drawings, where identical and similar elements have in some cases been provided with the same reference symbols.

BRIEF DESCRIPTION OF THE DRAWINGS

FIG. 4 shows the spanning tree after rearrangement on account of the network interruption shown in FIG. 3, and FIG. 5 shows the rearranged spanning tree from FIG. 4 with the network's data transport capacity aligned in accordance with one embodiment of the invention.

DETAILED DESCRIPTION OF THE INVENTION

Figure 1:
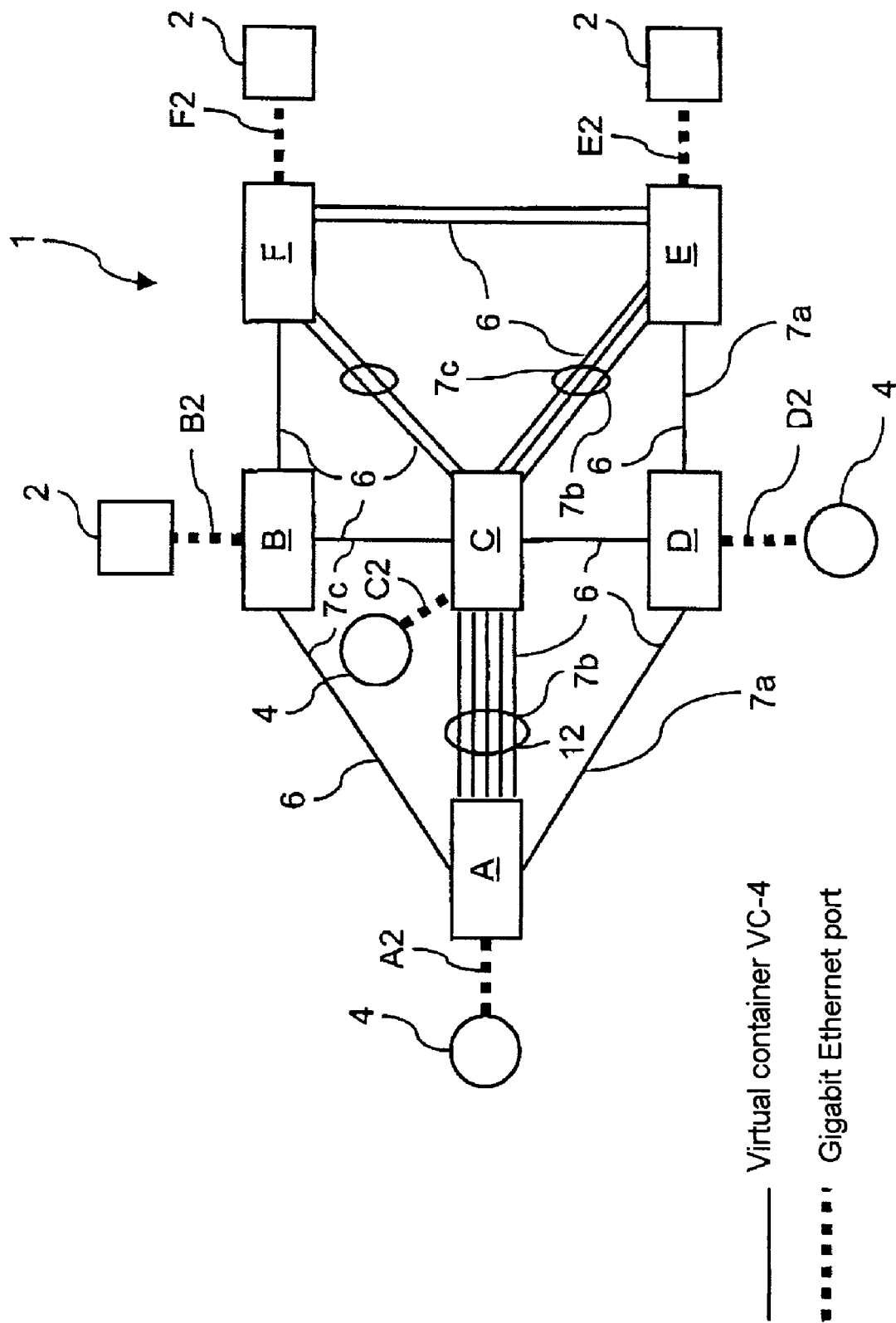
FIG. 1 shows a schematic illustration of a network with an illustrated data transport capacity.

FIG. 1 shows one exemplary embodiment of a SONET/SDH network 1 according to the invention with an exemplary number of six network nodes A to F. The network nodes A to F each have a gigabit Ethernet port A2 to F2 (client access point). Connected to the Ethernet ports A2 to F2 are Ethernet-compatible. devices, such as a computer 2 and a router 4. The network nodes shown all have a layer-II switching function which allows Ethernet data packets to be conveyed between the connected Ethernet ports, regardless of whether they physically come from an SONET/SDH port or from a client access point. The network nodes shown also have the ability to set up and release (ASTN) transport paths (SONET/SDH) autonomously.

Between pairs of network nodes A to F there are transport connections 6 which are used to transmit data packets embedded in virtual containers, in this example on the basis of the VC4 standard. In this context, each connecting line 6 represents an STM-1 transport connection with a 155 Mbit/s data capacity. In addition, one respective pair of the network nodes shown can be connected by means of subnetworks (which are not shown). These subnetworks (which are not layer-II switchable) need to be able to set up and release (ASTN) transport paths (SONET/SDH) autonomously. Since these subnetworks are not shown, the connections shown between the network nodes A to F are not physical connections but rather logical connections.

All the connections shown in FIG. 1 have been set up using virtually concatenated containers which are each members of an LCAS group. This is the prerequisite for the data transport capacity being able to be extended or reduced without first needing to remove the entire logical connection path and then needing to set it up again with a new capacity.

Figure 2:
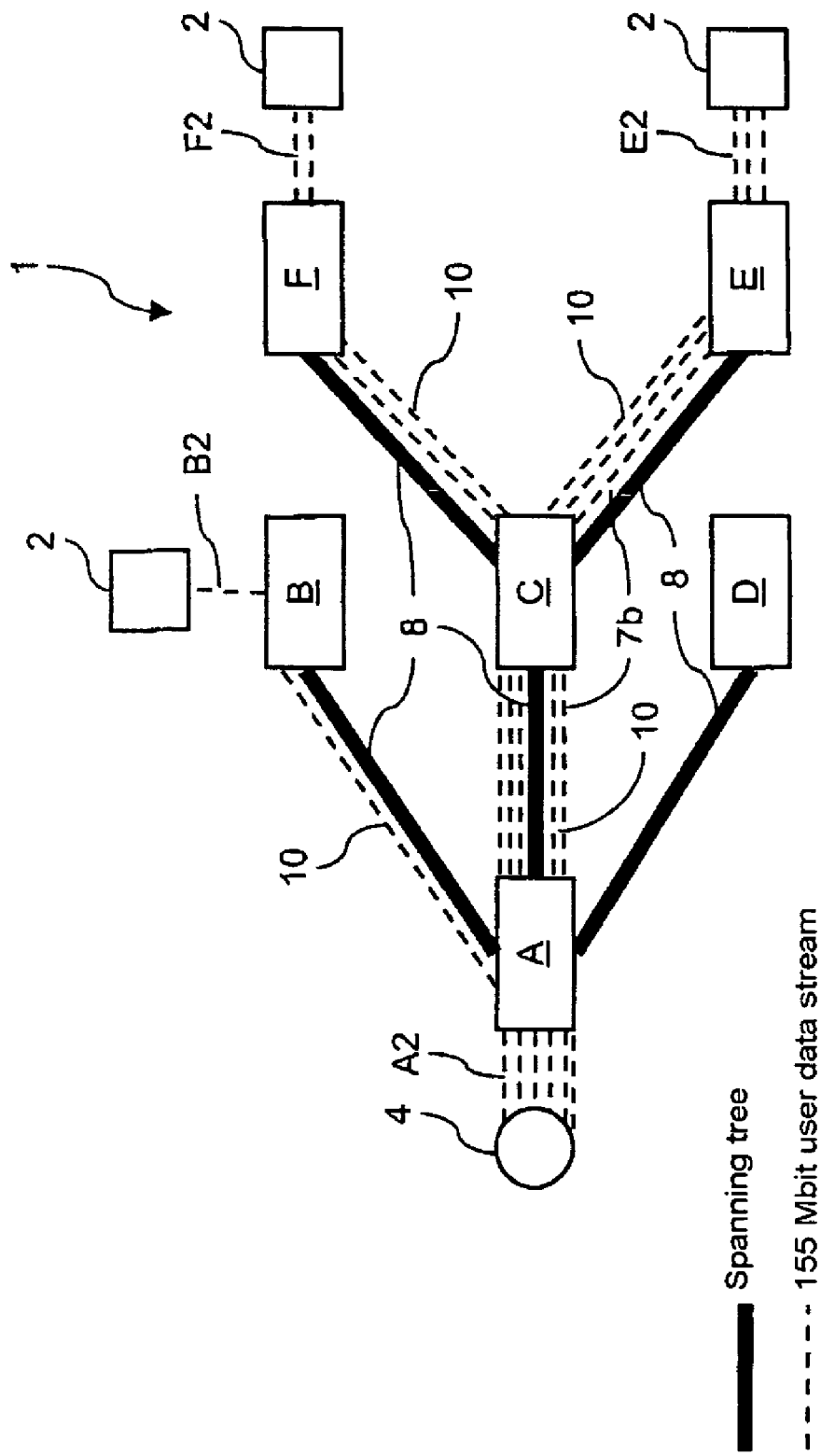
FIG. 2 shows the spanning tree (active topology) on the network from FIG. 1.

On account of the transport connections shown by way of example in FIG. 1, data packets emanating from a node A-F have various ways of reaching a destination node, e.g. the variants 7a, 7b, 7c between the node pair A and E. The spanning-tree protocol therefore calculates explicit, loop-free connections in the form of a tree structure. With reference to FIG. 2, this primary established spanning tree 8 (active topology) is shown.

The spanning-tree protocol suppresses the connections between the network nodes B and C, C and D, B and F, D and E and also E and F for user data packets and uses them merely for interchanging control data packets. This results in the primary active topology 8 with its loop-free tree structure. The various exemplary connection options 7a, 7b, 7c are thus reduced to a single actual connection, namely 7b.

The current user data stream or throughput is shown by way of example on the network 1. Each dashed line 10 represents part of the user data stream 10 with a transported volume of data with 155 Mbit/s between the corresponding network nodes. Thus, the user data stream chosen here by way of example is 155 Mbit/s between the network nodes A and B, 465 Mbit/s between the network nodes A and E and 310 Mbit/s between the network node A and F. The user data streams between the nodes A and E and also the nodes A and F overlap on the connection between the nodes A and C, which means that a user data stream of 755 Mbit/s is transported between the network nodes A and C. Altogether, the total user data stream between the network node A and all the other network nodes in total (A-X) is 930 Mbit/s.

Figure 3:
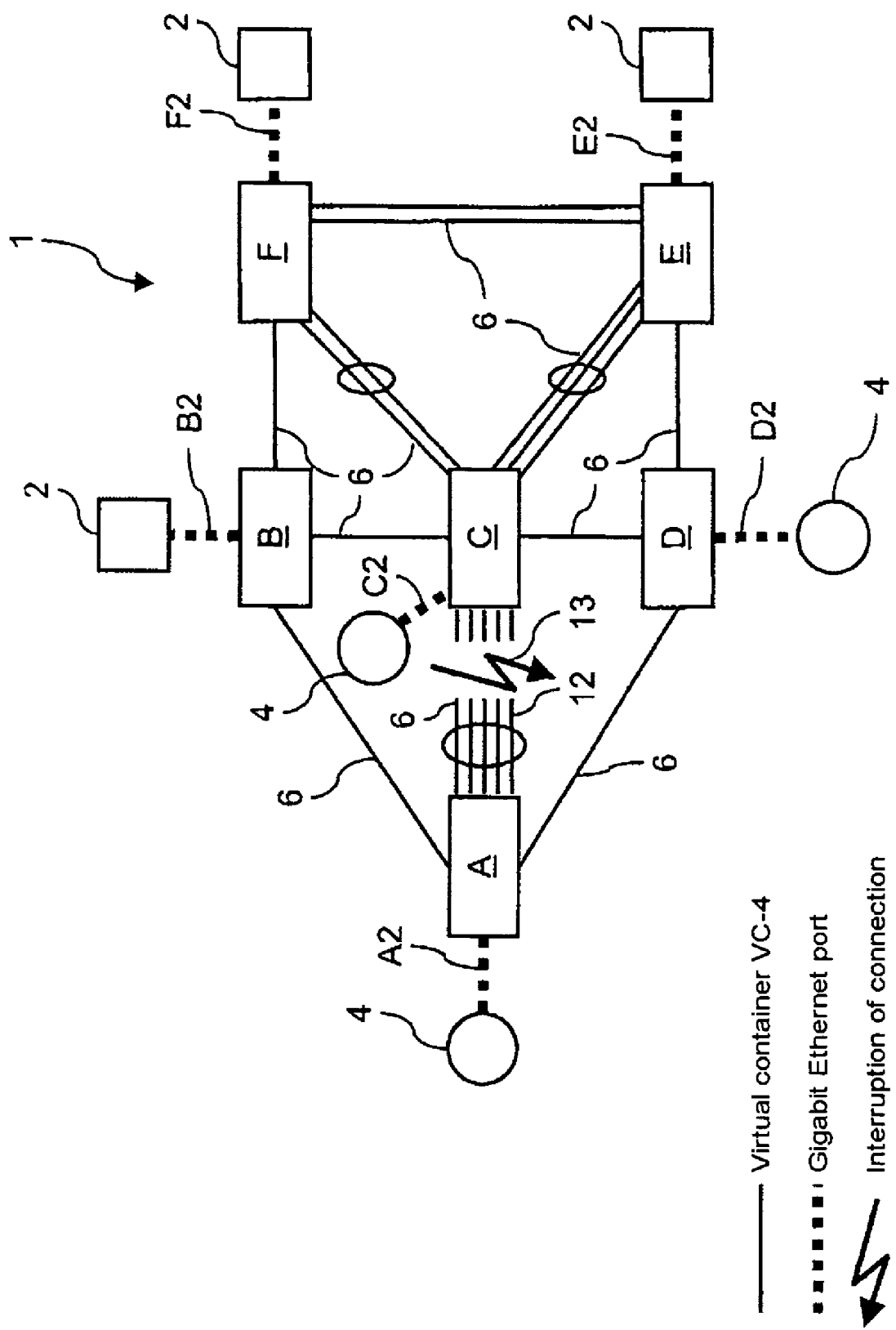
FIG. 3 shows the network from FIG. 1 after the connection between the network nodes A and C has been broken.

Referring to FIG. 3, the network 1 from FIG. 1 is shown, with the transport connection between the network node A and the network node C being interrupted on account of a break 13 in the line 12. On account of the branch A-C missing after failure of the transport connection 12, the data stream between the node A and the nodes E and F is interrupted.

The spanning-tree protocol reacts to this interruption by rearranging the active topology 8, as shown by way of example in FIG. 4. The rearranged spanning tree 8' has made the nodes C, E and F, which had become unavailable from A on account of the missing branch between the network nodes A and C, available again by activating (active topology) the substitute branches between the network nodes B and C and also B and F.

In this example, the data transport capacity which is available between the network node A and the total of the network nodes B, F and E following the change of topology is now only 155 Mbit/s in total on account of the bottleneck between the network nodes A and B. As a result, in this state, the data transport capacity between the network nodes A and B, A and F and also A and E is in each case also no more than 155 Mbit/s.

With a user data load of, by way of example, 930 Mbit/s which is unchanged with respect to the interference-free network, a massive data or packet loss therefore arises at the connecting points or ports 14 which are identified by the stars at the network nodes A, B, C and F.

This data loss at the ports 14 is detected using the method according to the invention and is used as a trigger for providing further logical transport connections between the network nodes A and B, B and C and also B and F. In the course of the autonomous alignment of the data transport capacities provided between two respective nodes as a result of a loss of data at the ports 14, loss of data at further ports may be observed and subsequently corrected, shown 14a by way of example in FIG. 4, which can also affect network nodes which were initially unable to measure a loss of data.

FIG. 5 shows the spanning tree 8' with the data capacity which has been increased after completion of all alignments of the data transport capacities.

To increase the data capacity as compared with FIG. 4, further transport capacity 16 is provided using additional virtual containers VC-4 with 155 Mbit/s per dotted line 16 between the network nodes A and B, B and C and also B and F. Following this provision of additional data transport capacity 16, the user data stream in this case again corresponds to that of the interference-free spanning tree shown in FIG. 2. In particular, the branch 7c has now been activated for the exemplary connection A-E from the original wide variety 7a, 7b, 7c.

Using the additionally provided data transport capacity, there now flows between the network nodes A and B a data stream of 775 Mbit/s additionally and 930 Mbit/s altogether, between the network nodes B and C there flow 310 Mbit/s additionally and 465 Mbit/s altogether, and between the network nodes B and F there flow 155 Mbit/s additionally and 310 Mbit/s altogether. The sum of the data streams following repair is thus 930 Mbit/s again between the network node A on the one hand and the network nodes B, E and F on the other (A-X).

The automatic set-up and release of additional data transport capacity or transport paths 16 makes use of the functionality of an automatically switched transport network (ASTN, ITU-T G.8080). The functions of the ASTN and the Ethernet layer-II network which is logically above it are combined, the network not being an asynchronous transfer mode network (ATM network), in particular. The ASTN allows a network to set up a transport path without the need for the users to intervene, e.g. if a primary path fails on account of an interruption in the connecting line.

According to a preferred embodiment of the invention, this ASTN functionality of the automatic path set-up/release using LCAS and virtual concatenation of transport containers (STS1, VC4, . . . ) is thus combined with the Ethernet transport resilience scheme (tree structure/active topology), or an ASTN with Ethernet properties and/or protocols (spanning tree or rapid spanning tree), in order to improve the resilience with minimum overdimensioning of the network capacity, or in order to compensate for dynamic changes in the capacity requirements.

However, the ASTN functionality is preferably not used to set up a complete new logical transport connection, but rather only to align the data transport capacity via the transport connections in the changed active topology 8', e.g. after a loss of data brought about by a connection interruption.

In this example, the trigger for this ASTN functionality is measurement of excessive data loss over a period of time T_loss or measurement of free excess data transport capacity for a period of time longer than T_idle. In the former case, further data transport capacity is provided, e.g. by setting up further logical paths 16. In the latter case, data capacity is released again, e.g. by closing the logical paths 16.

In general, the trigger for data loss is a disparity between the data transport capacity provided by the network at an arbitrary time and the data transport capacity required by the terminals (computers, routers, . . . ) at this time. This disparity may firstly arise on account of faults (as shown by way of example above), and may secondly also be the result of a requirement which has changed over the course of time.

In general, therefore, the mechanism discussed above is intended to reduce discrepancies in available and required data transport capacity to a minimum, regardless of what the cause of the discrepancy is.

Accordingly, the data network 1 according to one embodiment of the invention can be operated in the following order:
1. A SONET/SDH network 1 is set up. The network includes Ethernet layer-II switchable network elements. In addition, Ethernet ports are connected for clients 2, 4 (FIG. 1).
2. A transport connection with a minimal bandwidth 10 is set up between all pairs of network elements or network nodes A to F which are Ethernet-switchable. The connection is made, by way of example, using STS1, VC4 etc. or else lower-order containers, such as VT1.5, VC-12, etc. These paths are set up as members of a respective LCAS group. The use of the "spanning tree" 8 as an equivalent circuit function for the data traffic is made possible through the provision of at least one minimal SONET/SDH data transport capacity (FIG. 1). This activates the equivalent circuit function.

3. As a consequence of this activation, an active topology 8 is automatically set up on the Ethernet layer between all Ethernet switchable network nodes A to F (FIG. 2).
4. At the Ethernet switchable network nodes, performance monitoring points are activated which count the incoming and outgoing volumes of data and hence make it possible to determine, by way of example, loss of packets on account of an overload or overdimensioning of the transport capacity. At first, however, there is no data traffic present which could be counted.
5. The performance monitoring points have thresholds defined for them, e.g. as 95% of the maximum data transport capacity which is associated with the monitor point. These thresholds are called BW_loss and BW_idle and may generally differ. For the example described, BW_loss=BW_idle=100% client ports are activated in order to transport user data from the clients 2, 4.
6. As soon as the data traffic from the clients 2, 4, exceeds BW_loss times the primary or basic transport capacity (FIG. 4), a disparity (in the extreme case a loss of data) will be observed, and after a first period of time T_loss the change in the data transport capacity is triggered using the ASTN functionality in order to add additional capacity 16 between the network nodes A, B, C, F between which a disparity has been observed (data have been lost) (FIG. 5). If the data traffic has again been reduced to the extent that excess data transport capacity arises, the additional paths 16 are removed again after a second period of time T_idle.

The use of the feature described under Point 7. is particularly advantageous, in particular during normal network operation and in conjunction with the resilience scheme provided by the spanning-tree protocol.

7. The behaviour described under Point 7. is also applied, in particular, in cases in which there is a network failure, such as a physical connection interruption 13 (FIG. 3). In this case, the spanning-tree protocol is realigned and the data traffic is routed through the SONET/SDH network via a different path or spanning tree 8'.

If the excess of or the overdimensioning of the data transport capacity is kept as small as possible—which ought to be the goal of any network operator—then loss of data will arise at various points in the network after a connection has been interrupted (FIG. 4), and the change in the data transport capacity is triggered, in line with the invention, at the network nodes in question using the ASTN functionality.

The details of the control algorithm, of the dynamics and of the parameters, e.g. the periods of time T_loss and T_idle, the thresholds BW_loss and BW_idle, and also other possible control variables are aligned with respective applications.

According to one further advantageous aspect of embodiments of the invention, in which the performance monitoring counters are used on the Ethernet layer (data rates in/out and data loss) in order to trigger set-up and/or release of transport connections, the performance monitoring counters can be designed specifically per port, per flow of data, per priority, per VLAN-ID, per VPN-ID etc. Accordingly, the control algorithms contain particular counters or exclude these and contain control parameters which can be set by the operator in order to ensure the service quality on an individual basis.

The person skilled in the art will see that the embodiments described above are to be understood by way of example, and the invention is not limited to them but rather can be varied in diverse ways without departing from the scope and spirit of the invention.

It is claimed:

1. A method for controlling transport capacity for data transmission via a network, comprising the steps of:
providing a transport connection including a first data transport capacity for transmitting data between a first network node and a second network node in the network;
ascertaining at least one measured variable which is a measure of the current data load, wherein the at least one measured variable comprises a data loss rate ascertained in at least one of the first network node or the second network node, wherein the data loss rate is ascertained at least over a first period of time, wherein the ascertained data loss rate is compared with a first threshold value; and
changing, at a management entity, the first data transport capacity of the transport connection dependent on the at least one measured variable ascertained and the first data transport capacity, wherein additional data transport capacity is provided for the transport connection if the data loss rate exceeds the first threshold value during the first period of time.

2. The method of claim 1, wherein the transport connection is a container-based, virtually concatenated transport connection based on the SDH or SONET standard, and two layer-II switching functions in the network interchange data with one another via the transport connection using an Ethernet protocol.

3. The method of claim 2, wherein a spanning-tree protocol is used to define a loop-free spanning tree for transmitting the Ethernet user data on the network.

4. The method of claim 3, wherein the Ethernet user data are transmitted between the first and second network nodes along the spanning tree via the container-based SDH or SONET transport connection, the Ethernet user data being embedded into the containers in the container-based SDH or SONET transport connection.

5. The method of claim 4, wherein the at least one measured variable is ascertained at every Ethernet layer-II switchable network node along the spanning tree.

6. The method of claim 1, wherein the network nodes interchange user data with one another via the transport connection using an Ethernet protocol without a layer-II switching function being available or being used.

7. The method of claim 1, wherein the first and second network nodes form endpoints of the transport connection, and the at least one measured variable is ascertained at least at the first and second network nodes.

8. The method of claim 1, wherein the first and second network nodes run a program which compares the current data load with the first data transport capacity of the transport connection and uses the comparison result to control changing the first data transport capacity of the transport connection.

9. The method of claim 1, wherein the measured variable is ascertained regularly while the transport connection exists.

10. The method of claim 1, wherein data transport capacity for the transport connection is released if the data loss rate is below a second threshold value during a second period of time.

11. The method of claim 1, wherein the at least one measured variable is ascertained using performance monitoring counters for the Ethernet layer.

12. The method of claim 1, wherein the data loss rate is a packet loss rate or a bit loss rate.

13. The method of claim 1, further comprising performing a threshold value comparison on the basis of the remaining free data transport capacity.

14. The method of claim 1, wherein the data traffic transmitted via the network contains various attributes, and the first data transport capacity is changed using at least one of the attributes.

15. The method of claim 1, wherein the data traffic transmitted via the transport connection is divided up into different priority levels, and the first data transport capacity is changed dependent on the priority level of the respective data.

16. The method of claim 1, wherein the data traffic transmitted via the transport connection is divided up into data of higher and lower priority, and the first data transport capacity is changed dependent on the relative contribution of data with the higher and lower priorities to the data traffic.

17. A network for data transmission, comprising:
- a plurality of physically interconnected network nodes, wherein a transport connection is set up for transmitting data between a first and a second of the network nodes, the transport connection having a first data transport capacity, wherein the first and second network nodes are adapted for determining at least one measured variable which is a measure of the current data load, wherein the at least one measured variable comprises a data loss rate ascertained in at least one of the first network node or the second network node, wherein the data loss rate is ascertained at least over a period of time, wherein the ascertained data loss rate is compared with a threshold value; and
- a management entity having means for changing the first data transport capacity of the transport connection dependent on the at least one measured variable ascertained and the first data transport capacity, wherein additional capacity is provided for the transport connection if the data loss rate exceeds the threshold value during the time period.

18. A first network node component set up for use in a network for data transmission, comprising:
- means for communicating with a second network node component via a transport connection having a first data transport capacity for transmitting data between the first and second network node components;
- means for determining at least one measured variable which is a measure of the current data load wherein the at least one measured variable comprises a data loss rate ascertained in the first network node component or provided to the first network node component by the second network node component, wherein the data loss rate is ascertained at least over a period of time, wherein the ascertained data loss rate is compared with a threshold value; and
- means for requesting a change in the first data transport capacity dependent on the at least one measured variable ascertained and the first data transport capacity, wherein the ascertained data loss rate is compared with a threshold value, wherein additional capacity is provided for the transport connection if the data loss rate exceeds the threshold value during the time period.

19. A computer readable storage medium storing a software program which, when executed by a computer, causes the computer to perform a method for controlling transport capacity for data transmission via a network, the method comprising the steps of:
- providing a transport connection including a first data transport capacity for transmitting data between a first and a second network node in the network;
- ascertaining at least one measured variable which is a measure of the current data load wherein the at least one measured variable comprises a data loss rate ascertained in at least one of the first or second network node, wherein the data loss rate is ascertained at least over a period of time, wherein the ascertained data loss rate is compared with a threshold value; and
- changing the first data transport capacity of the transport connection dependent on the at least one measured variable ascertained and the first data transport capacity, wherein additional data capacity is provided if the data loss rate exceeds the threshold value during the first period of time.

* * * * *